Aug. 6, 1946.   E. VOLET   2,405,382
ACCELEROMETER
Original Filed Feb. 24, 1943
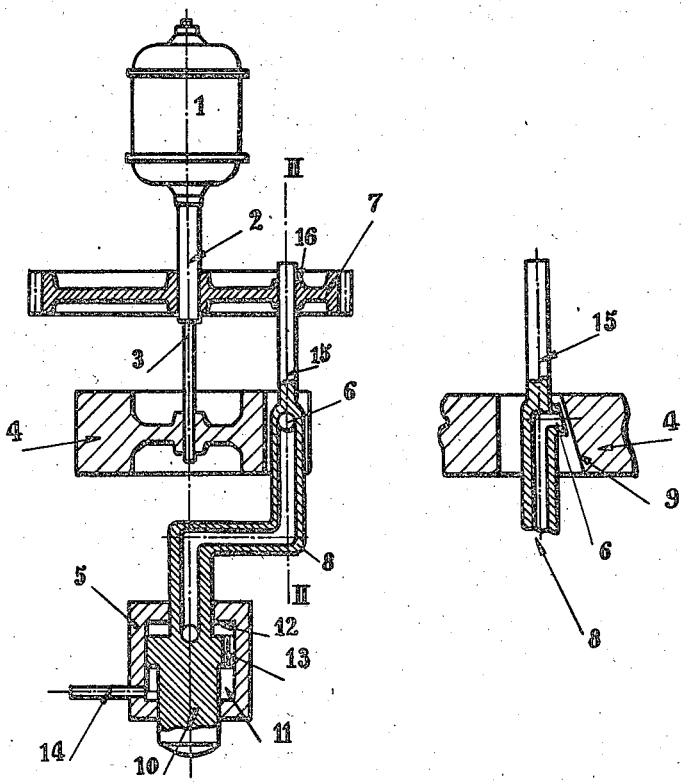
Fig.1
Fig.2
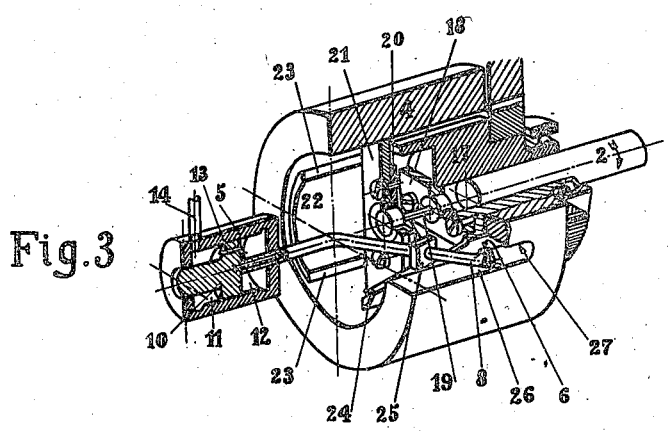
Fig.3
INVENTOR
EDOUARD VOLET,
BY
ATTORNEYS Patented Aug. 6, 1946

2,405,382

UNITED STATES PATENT OFFICE 2,405,382

ACCELEROMETER

Edouard Volet, Vevey, Switzerland

Original application February 24, 1943, Serial No. 476,985, now Patent No. 2,358,894, dated September 26, 1944. Divided and this application June 28, 1943, Serial No. 492,620. In Switzerland February 5, 1942

2 Claims. (Cl. 264—6)

This application is a division of my copending application Serial No. 476,985, filed February 24, 1943, now Patent No. 2,358,894 issued September 26, 1944.

It is known that several types of accelerometers are already in existence and use particularly for adjusting the operational speed of turbines. Generally speaking, known accelerometers comprise an inertia mass elastically secured to a shaft so driven by a belt or by a motor fed or energized by the machine which requires to be regulated as to truly follow all speed variations of said machine. Owing to this arrangement, each speed variation of the shaft brings about a relative angular displacement between the inertia mass elastically secured to its shaft and some suitable part rigidly driven by said shaft. As the value of said angular displacement is in terms of the acceleration, it can be used as a measure thereof. Moreover, in known accelerometer constructions, the inertia mass is generally secured to its driving shaft by means of elastic arms. This arrangement is not entirely satisfactory because a very long and difficult job is involved in assembling said arms and properly setting and truing up their operative length and resiliency.

It is an object of the present invention to provide a new or improved accelerometer pertaining to the aforesaid type but adapted to obviate the foregoing disadvantages owing to the fact that the inertia mass is rigidly secured to one end of a twistable bar, spindle or axis whose other end is rigidly driven by the shaft the speed variations of which it is desired to measure, whereby measuring of the acceleration of said shaft is readily derived from the degree of elastic distortional twist of said bar or spindle.

Another object of the invention is to provide an improved accelerometer as aforesaid of extremely simple and yet rugged structure calling for no delicate adjustment and made up of a minimum number of parts capable of being machined beforehand and readily assembled to correct operational positions.

Yet another object of the invention is to provide an improved accelerometer as aforesaid incorporating simple means whereby its speed droop or statism, i. e., the relation between the speeds of the machine in idle running condition and in full load running condition, can be readily set to proper value.

A further object of the invention is to provide an improved accelerometer as aforesaid including simple means whereby centering and balancing of the inertia mass with respect to its carrying axis or spindle can be very easily performed.

A still further object of the invention is to provide an improved accelerometer as aforesaid incorporating a fluid operated relay having a piston driven by a revolving shaft and fitted with a pipe extension whose outlet port can effect on the one hand a relative angular motion with respect to the operative wall of an aperture in an inertia mass rigid with a twistable spindle fast upon said shaft, said angular motion varying the rate of fluid delivery through said port and on the other hand such a relative translatory motion as to restore the fluid delivery to normal value connoting balanced condition of the relay and proper working of the machine.

With these and such other objects in view as will incidentally appear hereafter, the invention comprises the novel construction and combination of parts that will now be described with reference to the accompanying diagrammatic drawing which illustrates suitable embodiments of the same and which forms a part of the present disclosure.

In the drawing:

Figure 1 is a vertical sectional view of an accelerometer built for operating a hydrostatic relay.

Figure 2 is a fragmentary sectional view taken along the line II—II of Fig. 1.

Figure 3 is an isometric view partly broken away for the sake of clearness of a more involved constructional embodiment of the accelerometer.

As will be seen from the showing of Fig. 1, there is provided a motor 1 so fed or energized from the machine which requires to be regulated as to truly follow all the speed variations of this machine. One end of the motor shaft 2 or like actuator has fixed thereto a spindle 3 constituted by a twistable steel or like bar, thereby permitting said spindle to undergo a high resilient twist responsive to a relatively small torsional torque. The free end of the spindle 3 has rigidly fixed thereto an inertia mass 4 in the form of a wheel or spider extending substantially at right angle to the spindle 3.

As will be readily understood, each speed variation of the driving shaft 2 produces, owing to the inertia mass which must be driven thereby, a torque the tendency of which is to twist the spindle or bar 3. Such torque exerts a torsional stress upon said spindle. The value of said torsional stress or twist is in terms of the acceleration. As a result of this, the mass 4 is angularly displaced with respect to the actuating shaft 2.

This displacement is a measure of the acceleration.

In the constructional form of the accelerometer shown in the drawing, the angular displacements of the inertia mass 4 hydrostatically operate a differential relay 5 by throttling or opening out more or less (as the case may be) an outlet port 6 formed in a member connected to, and non-distortably driven by, the actuating shaft 2 through the medium of a toothed wheel 7 which is fast upon said shaft and which in turn drives a bar 15 integral with a hollow rod or pipe 8 of cranked outline whose upper end terminates in the port 6. The latter is arranged in front of a radially extending slanting wall 9 defining an aperture in the mass 4 as shown in Fig. 2.

The relay comprises a cylinder in which is slidably and revolubly housed a piston 10 defining a pair of chambers 11, 12 of varying volumes interconnected by an accurately gaged narrow channel 13 and receiving fluid from an inlet pipe 14. The upper chamber 12 communicates through port 8a with the pipe 8 which, as above stated, terminates in the port 6.

As will be observed, any angular displacement of the inertia mass 4 moves the radially extending wall 9 off or toward the port 6, thereby altering the intensity of fluid delivery therethrough. Such alteration breaks the equilibrium between those thrusts exerted on both faces of the piston which is therefore axially shifted. As a result of this, the port 6 effects a translatory motion since the bar 15 has a sliding fit in a sleeve 16 formed integral with the wheel 7. As the radially extending wall 9 slants with respect to the rotational axis of the inertia mass 4, such a displacement of the port 6 along the slanting wall 9 tends to correct the alteration of fluid flow intensity caused by the angular displacement of the mass 4. Consequently the piston 10 retrieves a balanced position as soon as the intensity of fluid delivery through the port 6 has resumed its original value.

As will be seen, it is the inclination of the radially extending wall 9 which provides for proper speed droop of the accelerometer or in other words for the relation between the speed of the machine when it runs idle and its speed when it runs under full load. In order to modify the value of said speed droop, it would be sufficient for example to provide for said wall to be orientatable under the control of a movable member fixedly secured to the mass 4 by means of any known or conventional device enabling the degree of slant of said wall 9 to be altered with respect to the rotational axis of the mass 4. Owing to such an arrangement, it would become possible to also modify the speed droop of the accelerometer by varying in any conventional way the useful length of the spindle or in other words the distance between the point at which it is fitted to the shaft 2 and the point at which the mass 4 is secured. Alternatively the speed droop of the accelerometer might be varied by imparting, by means of a conventional device, an adjustable inclination to the bar 15 with respect to the rotational axis of the mass 4 and also by arranging for the wall 9 to extend in a plane passing through said rotational axis.

The constructional embodiment of the accelerometer shown in Fig. 3 comprises a sleeve 17 rigidly secured to the shaft 2 which revolves as shown by the arrow. The sleeve 17 has a cylindrical extension 22 formed with a pair of longitudinal slots 23 extending parallel to the rotational axis and with a slot 24 extending obliquely to said axis. Moreover, the sleeve unit thus formed has rigidly fixed thereto a plate 18 into which is fitted one end of a spindle 19. This spindle is aligned with the shaft 2 and has its other end provided with an intermediate member 20 fixed in turn to a yoke member 21 engaged through the slots 23 and rigidly connected to the inertia mass 4 which is cylindrical and freely encompasses the sleeve unit. The cam slot 24 forms a guide for a block 25 rigid on the pipe 8 formed at its free end with the outlet port 6. The pipe 8 is engaged through an elongated aperture 26 formed in the mass 4 parallel to the rotational axis. The port 6 is formed at the end of the pipe 8 in front of the operative face 27 of the aperture 26. The pipe 8 is connected at its end remote from the port 6 to a differential hydrostatic relay similar to the one described with reference to Fig. 1.

The spindle 19 is capable of being twisted, wherefor it has a small diameter and is made of a material having a high mechanical strength together with a high degree of resiliency so that when the shaft 2 undergoes a change of speed, the inertia of the mass 4 brings about a resilient torsion of the spindle 19 and therefore a relative angular displacement of said mass 4 with respect to the sleeve 17. This unmasks the port 6 and alters the rate of fluid flow therethrough, thus varying the fluid pressure inside the pipe 8. Such angular displacement is a linear function of the acceleration.

As described with reference to Fig. 1, a variation in the rate of fluid flow through the port 6 breaks the balance between the thrusts exerted on both faces of the piston 10. Consequently the latter is shifted and moves with it the pipe 8.

In the construction shown in Fig. 3, the orientation of the obliquity of the guiding or camming slot 24 is so provided as to cause the longitudinal displacement of the piston 10 to bring about a restoration of the original rate of delivery through the port 6 by shifting the angular position of said port with respect to the wall 27. Consequently the obliquity of the camming slot 24 determines the speed droop of the accelerometer or in other words the ratio between the speed of the machine when it runs idle and its speed when it runs under full load. It is evidently possible, with a view to allowing of a variation of said speed droop, to provide a guiding slot 24 having adjustable obliquity or camming action.

It will be seen that the aforesaid accelerometer has an extremely simple construction and calls for no precise adjustment inasmuch as all the parts of which it is made up can be built and machined beforehand and then assembled together without requiring any special manipulation or skilled labor. As the inertia mass 4 is rigidly fixed to its carrying spindle, proper centering and balancing thereof present no difficulty whatever.

Obviously the angular displacement of the mass 4 with respect to the driving shaft 2 may be measured by means of a device other than the one described in the foregoing. Such displacement may be measured for example optically by means of a pair of disks formed with slots, one of said disks being integral with the mass 4, while the other disk is integral with or secured to the shaft 2. Alternatively such displacement may be measured electrically by varying the coupling conditions between a pair of coils or windings, one of which is supported by the mass 4 while the other one is driven by the shaft 2.

Minor constructional details might be changed without sacrificing the aforesaid advantages or departing from the scope of the subjoined claims.

What is claimed is:

1. An accelerometer for maintaining constant speed of an operating machine, comprising, in combination, a driven shaft, a sleeve fixed to said shaft to rotate therewith, said sleeve having a pair of longitudinal slots extending parallel to the axis of rotation of the sleeve and also having a cam slot extending obliquely to said axis, an annular inertia mass arranged co-axially with the shaft and having an aperture; a twistable resilient spindle arranged co-axially with the shaft, sleeve, and annular inertia mass; means for connecting one end of the spindle rigidly to the sleeve, a yoke member rigidly connected to the other end of the spindle and having its outer end portions engaged in said longitudinal slots of the sleeve, and twist responsive means for modifying the speed of rotation of said shaft through the relative differential movement between the inertia member and the sleeve, said means including a fluid cylinder disposed co-axially with the shaft and spindle, a ported piston in said cylinder dividing the same into opposite chambers, a cranked hollow pipe element connected at one end with the piston and communicating with one of the chambers of the fluid cylinder and having its other end terminating in a port disposed in said aperture of the inertia member, and means carried by the pipe element and slidable in the cam slot of the sleeve whereby relative movement between the sleeve and inertia mass will move the port of the pipe element into and out of engagement with a wall of the said aperture in the annular member.

2. An accelerometer for maintaining constant speed of an operating machine, comprising, in combination, a driven shaft, a rotatable member fixed to said shaft to rotate therewith, said member having guide means extending parallel to the axis of rotation of the said member and also having a cam surface extending obliquely to said axis, an annular inertia mass arranged co-axially with the shaft and having an aperture; a twistable resilient spindle arranged co-axially with the shaft, rotatable member, and annular inertia mass; means for connecting one end of the spindle rigidly to the rotatable member, a yoke member rigidly connected to the other end of the spindle and having its outer end portions engaged with said guide means and cam surface, and means to transform the angular movement of the inertia mass into an axial movement for modifying the speed of rotation of said shaft through the relative differential movement between the inertia member and the rotatable member, said means including a fluid cylinder disposed co-axially with the shaft and spindle, a ported piston in said cylinder dividing the same into opposite chambers, a cranked hollow pipe element connected at one end with the piston and communicating with one of the chambers of the fluid cylinder and having its other end terminating in a port disposed in said aperture of the inertia member, and means carried by the pipe element and slidable on the cam surface of the rotatable member whereby relative movement between the rotatable member and inertia mass will move the port of the pipe element into and out of engagement with a wall of the said aperture in the annular member.

EDOUARD VOLET.